March 1, 1927. 1,619,672
H. R. HOLMES
POWER TRANSMISSION FOR WHEELS
Filed July 24, 1923  6 Sheets-Sheet 4

INVENTOR.
Harleigh R. Holmes
BY
his ATTORNEY

March 1, 1927.
H. R. HOLMES
POWER TRANSMISSION FOR WHEELS
Filed July 24, 1923  6 Sheets-Sheet 5
1,619,672
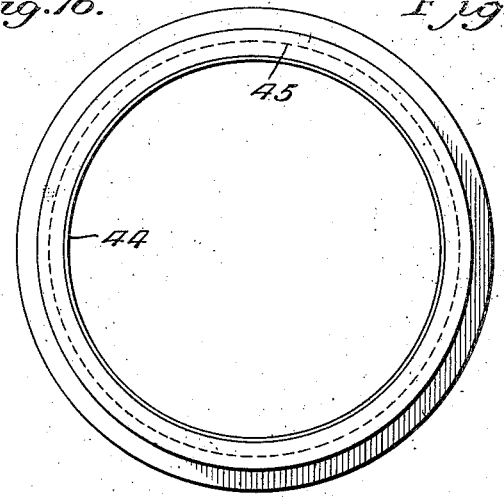
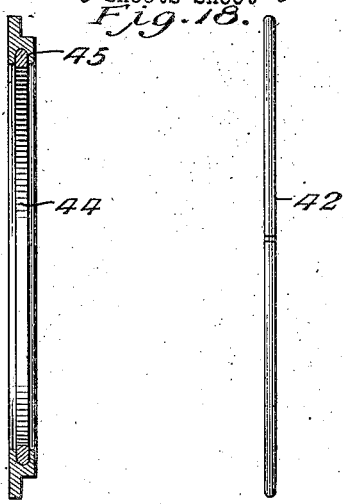
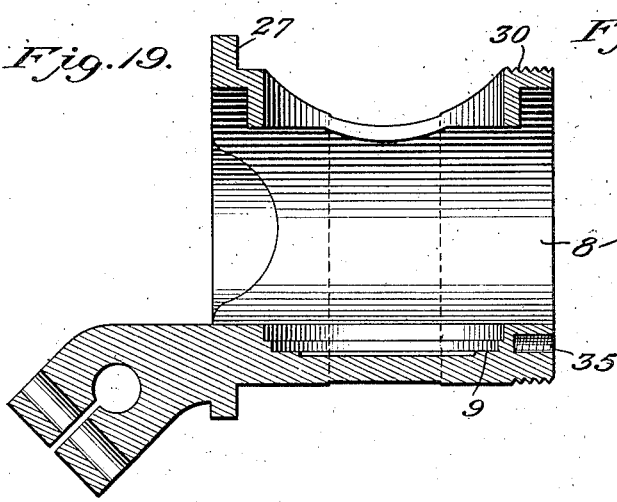
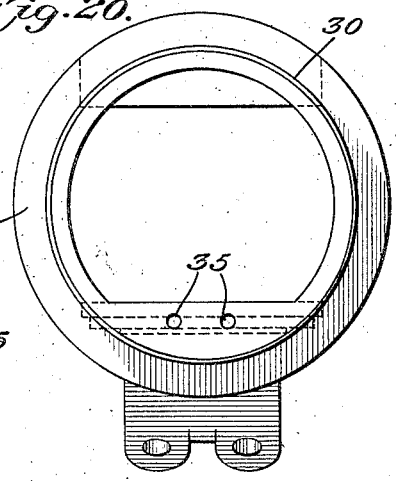
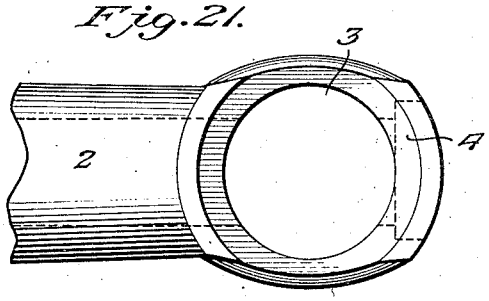
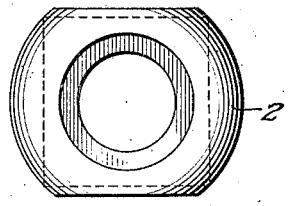
INVENTOR.
Harleigh R. Holmes
BY Vernon E. Hodges
his ATTORNEY March 1, 1927. 1,619,672
H. R. HOLMES
POWER TRANSMISSION FOR WHEELS
Filed July 24, 1923  6 Sheets-Sheet 6
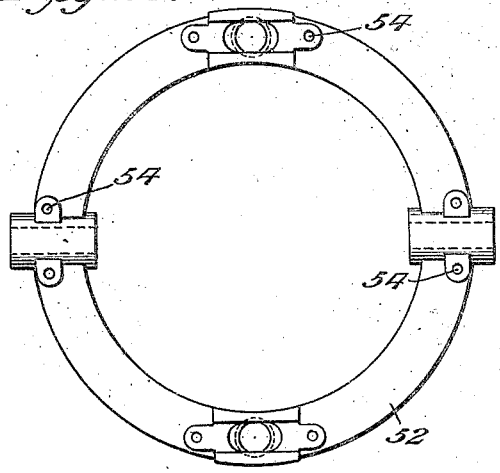
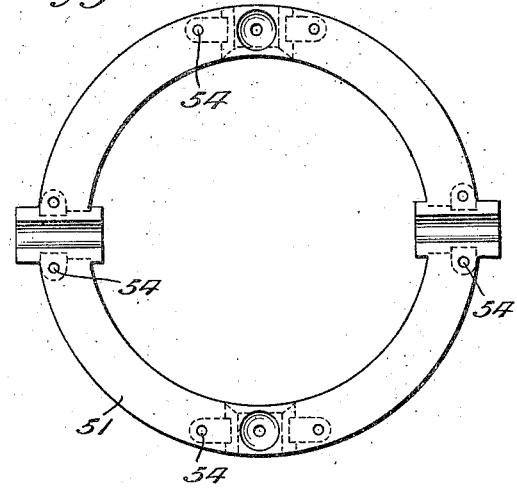
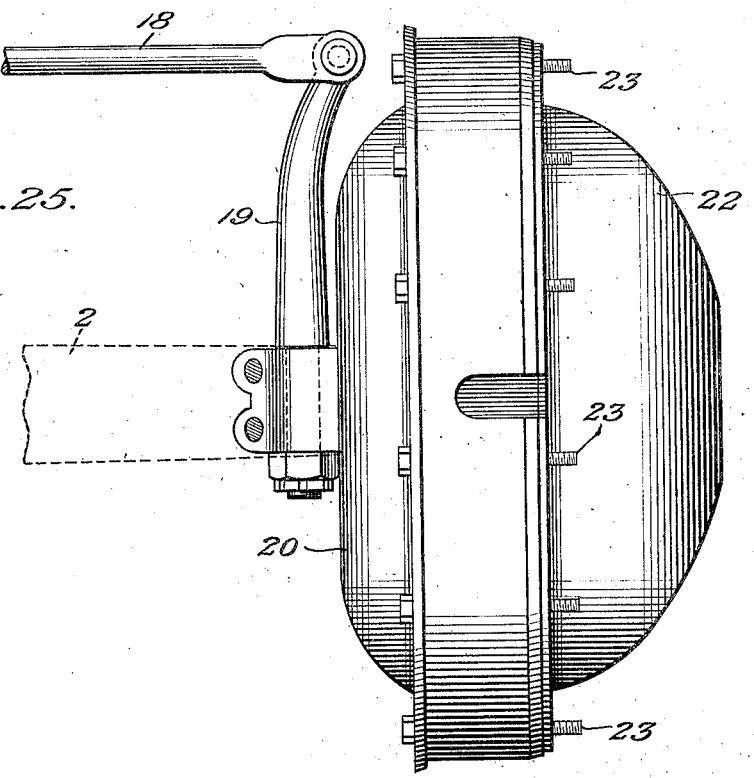

Patented Mar. 1, 1927.

1,619,672

UNITED STATES PATENT OFFICE.

HARLEIGH R. HOLMES, OF DENVER, COLORADO.

POWER TRANSMISSION FOR WHEELS.

Application filed July 24, 1923. Serial No. 653,609.

My invention relates to an improvement in power transmission for wheels.

The fundamental feature of the invention is to provide a four-wheel drive for vehicles such as trucks and automobiles.

This present invention is an improvement on the invention set forth in Letters Patent 1,377,131 granted to me May 3, 1921.

Figure 4:
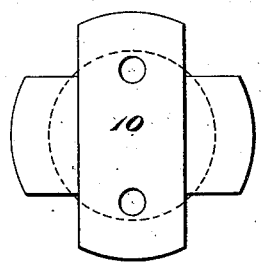
Figure 9:
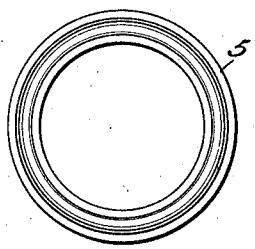
Figure 10:
Figure 5:
Figure 11:
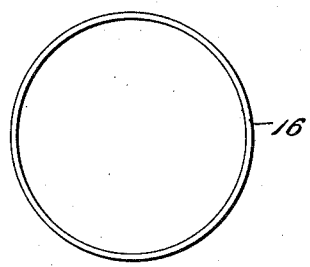
Figure 12:
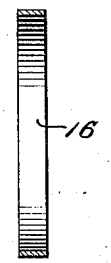
Figure 6:
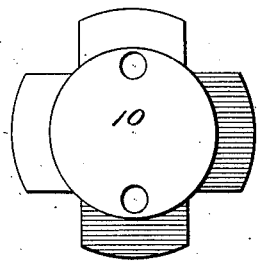
Figure 13:
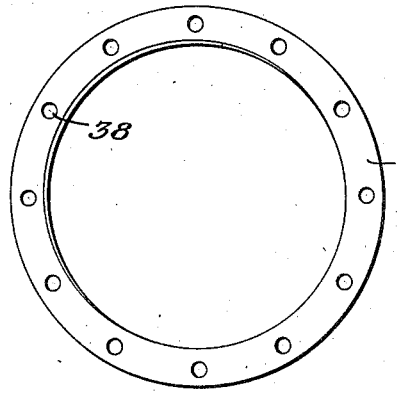
Figure 14:
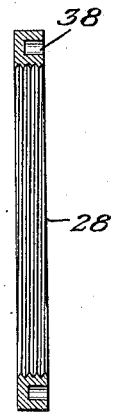
Figure 7:
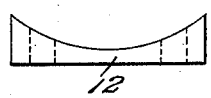
Figure 8:
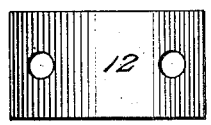
Figure 15:
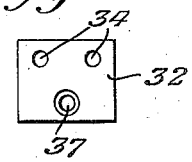

Figures 4, 5, and 6 are plan, side and bottom elevations, respectively, of the ball race cap:

Figures 7 and 8 are side elevations and plan, respectively, of the ball race bar:

Figures 9 and 10 are elevation and section, respectively, of the ball race:

Figures 11 and 12 are elevation and section, respectively, of the dust ring:

Figures 13 and 14 are elevation and section, respectively, of the adjusting ring:

Figure 15 is an elevation of the locking plate:

Figures 16 and 17 are elevation and section, respectively, of the larger dust ring:

Figure 18 is an elevation of the snap ring;

Figures 19 and 20 are section and elevation, respectively, of the spindle:

Figures 21 and 22 are plan and end views, respectively, of the axle housing:

Figures 23 and 24 are elevations, respectively, of the inner and outer compensating rings:

Figure 25 is a plan of the front wheel and axle in position.

The axle 1 is confined within a housing 2, which latter is a part of the frame of the machine.

The axle housing 2 is provided at its outer end with a cylindrical orifice 3 which extends vertically and at opposite ends. The ball race seats 4 are formed to receive the upper and lower ball races 5. Above and below are the ball races 6 and confined between the upper and lower ball races 5 and 6 are the ball bearings 7. A spindle 8 is more or less cylindrical in form and disposed horizontally and is provided with a seat 9 in its bottom which receives and has seated therein the lower ball race 6, and a ball race cap 10 at the top has a corresponding seat 11 which receives the upper ball race 6. The spindle 8, a ball race bar 12 beneath the spindle and the ball race cap 10 are held together by a pair of bolts 13 having nuts 14 screwed on their upper ends as viewed in Figures 1 and 3. These bolts 13 extend through the central orifice 3 of the axle housing on either side of the axle and are preferably recessed as at 15 on each side of the axle to afford a little extra clearance space, with the axle when the wheel is turned in steering the vehicle.

Dust rings 16 and 17 embrace the lower and upper ball races 5 and 6 respectively closing the spaces between them to exclude dust from the ball bearings.

The wheel is steered through the medium of this spindle 8 by means of a tie-rod 18 pivotally connected with the spindle arm 19. (See Figure 25.)

Figure 1:
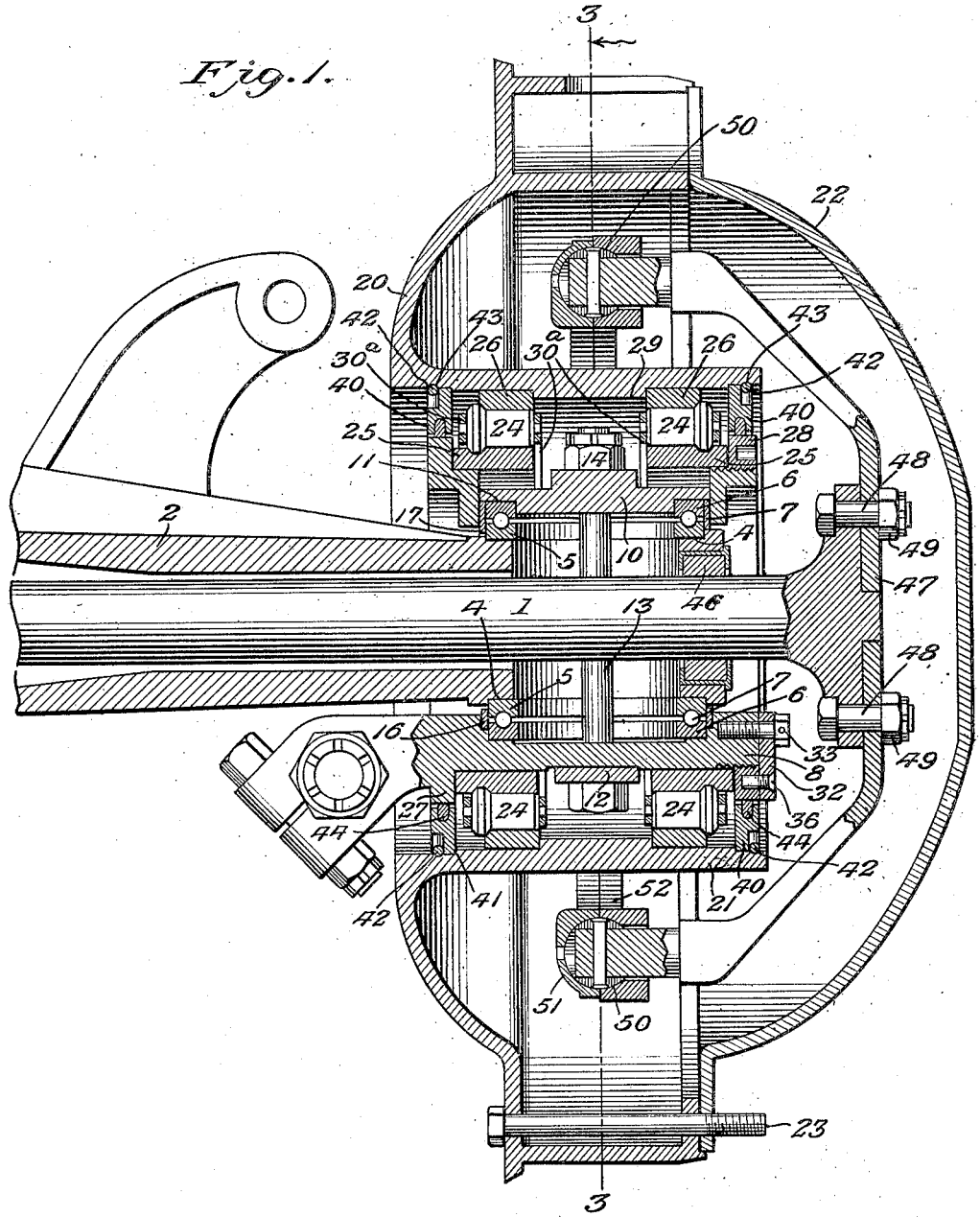
Figure 1 is a vertical transverse section through the front wheel and axle.
Figure 2:
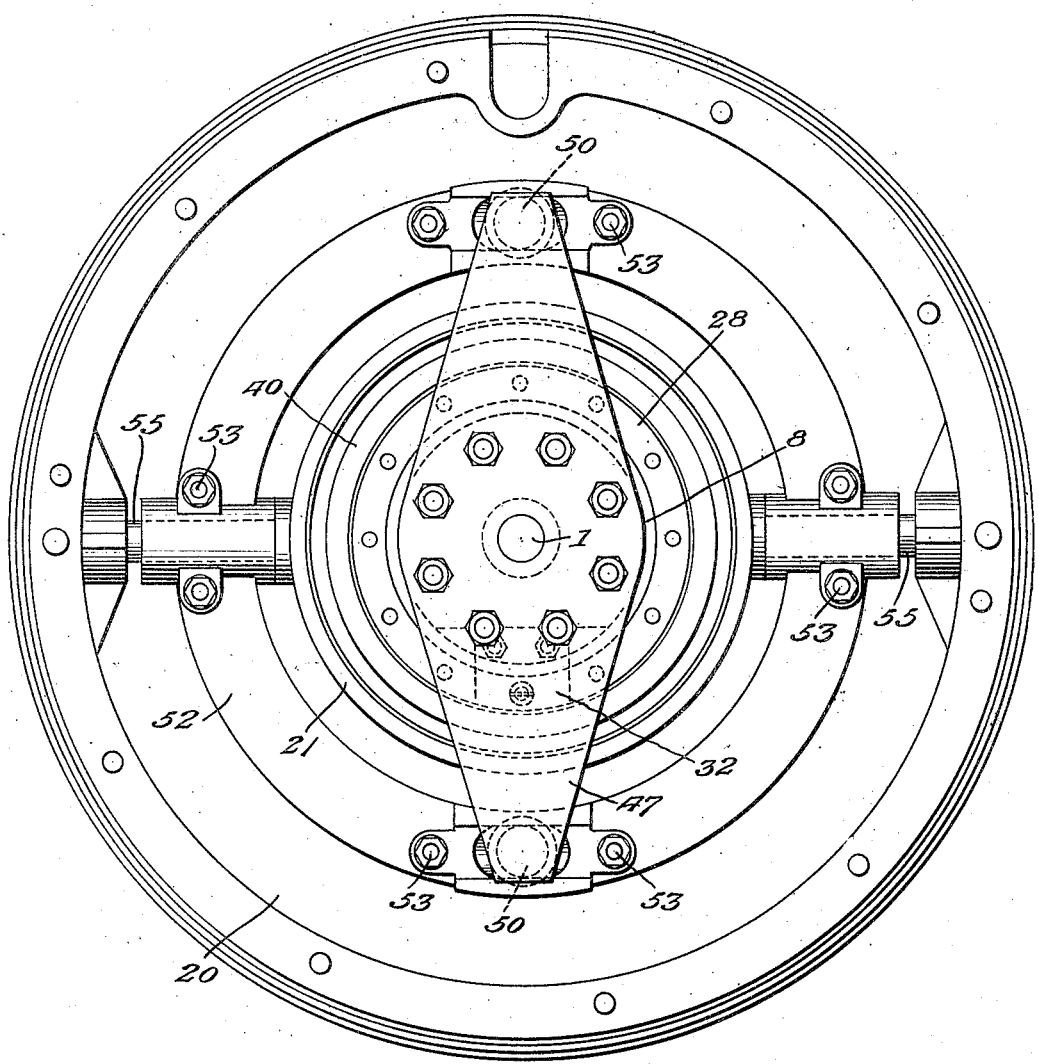
Figure 2 is a side elevation of the wheel and axle with the cover plate removed.
Figure 3:
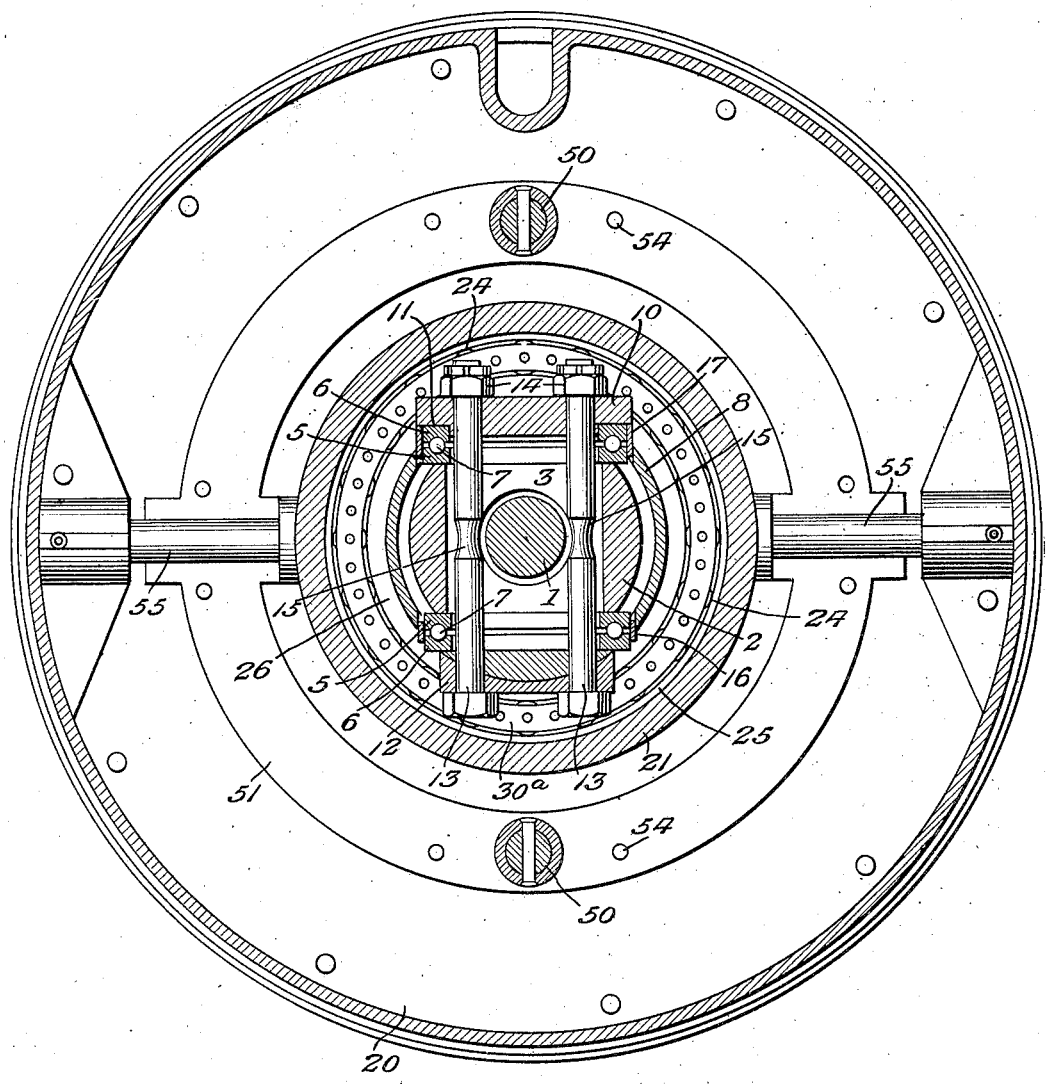
Figure 3 is a section on the line 3—3 of Fig. 1.

The main housing 20 has an integral hub 21 at the center which surrounds the spindle 8 and is concentric therewith, and encloses the various parts just described, as shown in Figures 1 and 3. The main housing 20 with the cover plate 22 which is held thereon by bolts 23 house and enclose substantially all the mechanism of the wheel.

Two sets of roller bearings 24 are interposed between the spindle 8 and the hub 21 of the wheel as viewed in Figures 1 and 3, and these are held in the raceways 25 and 26, the two raceways 26 resting respectively against an upstanding shoulder 29 formed in the bore of the hub. The bearings of the rollers are rotatably supported in annular rings 30ª in the usual manner. The inner raceway 25 is held in place by an adjusting ring 28 screwed on the threads 29 formed on the outer end of the spindle 8. A locking plate 32 is fastened to the spindle 8 by screws 33 extending through holes 34 in the locking plate and holes 35 in the outer end of the spindle, as shown in Figures 1, 15, 19 and 20, and this locking plate is fastened to the adjusting ring 28 by a screw 36 which passes through the hole 37 in the locking-plate 32 and is inserted into one of the holes 38 in the adjusting ring 28, (see Figures 1, 2, 13, 14 and 15).

Dust rings 40, one on either side fill the space between the shoulder 27 on the spindle and the hub 21 of the wheel on the inside and adjusting ring 28 and the hub 21 on the outer end as viewed in Figure 1, they being held against shoulders 41 by snap rings 42

(see Figure 18) which extend into annular recesses 43 formed in position to receive them in the wall of the hub. Packing ring 44 of felt or other material is received in a groove 45 in the dust rings as shown in Figures 1, 16 and 17.

A felt ring 46 surrounds the axle at the outer end of the axle housing to exclude dust as shown in Figure 1.

A power yoke 47 is held securely on the extreme outer end of the axle 1 by bolts 48 and nuts 49 thereon as a means for transmitting the motion of the axle to the wheel. The opposite ends of the power yoke extend inwardly to the vertical axis of the wheel where they are connected through ball and socket joints 50 with a pair of compensating rings 51 and 52, as viewed in Figures 1, 2, 3, 23 and 24. These compensating rings are held rigidly together by four pairs of bolts 53 (see Figure 2) which extend through holes 54 as shown in Figures 2, 3, 23 and 24.

These compensating rings are connected with the main housing 20 by compensating ring pins 55. There are two of these and they are located at points opposite each other and in line with the central axis of the axle and at points equidistant from the ball and socket joints 50 at the ends of the power yoke 47.

I claim:

1. A power transmission for vehicles including an axle, an axle housing having a transverse opening therethrough, a spindle, anti-friction bearings interposed between the axle housing and the spindle, and means passing through the transverse opening in the housing and on either side of the axle for securing the spindle, axle housing and bearings together.

2. A power transmission for vehicles including an axle, an axle housing having a transverse opening therethrough, a spindle, ball races and ball-bearings interposed between the axle housing and spindle, a ball race cap seated on the ball races, and bolts passing through the transverse opening in the housing and on either side of the axle for securing the spindle, axle housing, ball races, balls and ball race cap together.

3. A power transmission for vehicles including an axle, an axle housing, a spindle, a ball race cap, ball races and balls interposed between the axle housing and cap, and bolts extending through the spindle and cap and through an orifice in the housing on either side of the axle for holding the parts together.

4. A power transmission for vehicles including an axle, an axle housing, a spindle, a ball race cap, ball races and balls interposed between the axle housing and cap, bolts extending through the spindle and cap and through an orifice in the housing on either side of the axle for holding the parts together, and dust rings seated in the spindle and closing the spaces between the ball races for excluding dust.

5. A power transmission for vehicles including an axle, an axle housing, a spindle surrounding the end thereof, bearings interposed between the axle housing and spindle, a main housing having a hub, bearings interposed between the spindle and hub, the spindle having a threaded portion, an adjusting ring screwed thereon and having a plurality of holes therein, a locking plate secured to the spindle and means connected with the locking plate in position to enter the holes in the adjusting ring for holding the latter in its adjusted position.

6. A power transmission for vehicles including an axle, an axle housing, a hub, a spindle mounted within the hub, bearings interposed between the hub and spindle, the spindle having a threaded portion, an adjusting ring screwed thereon and having a plurality of holes, a locking-plate secured to the spindle, and a screw passing through the locking plate and entering one of the holes in the adjusting ring for holding the latter in its adjusted position.

7. A power transmission for vehicles including an axle, a spindle, a wheel, an adjusting ring secured to the spindle, a locking plate bolted to the spindle and secured to the adjusting ring for holding the latter in its adjusted position, dust rings interposed between the hub of the wheel and the adjusting ring and the spindle, and bearings for holding said dust rings removably in place.

8. A power transmission for vehicles including an axle, an axle housing, a spindle, bearings interposed between the spindle and axle housing, a main housing having a hub with a space between the hub and the axle housing and between the hub and the outer portion of the main housing, means connected with the axle and extending into the space between the hub and the main housing and connected with the latter for transmitting the motion of the axle to the main housing and permitting the main housing to be turned to steer the vehicle.

9. A power transmission for vehicles including an axle, an axle housing, a spindle, dust bearings between the spindle and axle housing, a main housing and hub cast in one piece with a space between the hub and the axle housing and between the hub and the outer portion of the main housing, a power yoke secured to the outer end of the axle, its ends extending backward into and housed by the space between the hub and the outer portion of the main housing, and means housed within this space connected with the ends of the yoke and with the main housing for transmitting the motion of the axle to the main housing and permitting the main housing to be turned to steer the vehicle.

10. A power transmission for vehicles including an axle, a main housing, a power yoke secured to the outer end of the axle, balls mounted directly on the ends of the power yoke, compensating means clamped to these balls and forming sockets therefor, and means connecting the compensating means directly with the outer portion of the main housing at points opposite each other and equidistant from the ends of the power yoke.

11. A power transmission for vehicles including an axle, a main housing, a power yoke secured to the axle, compensating means connected with the ends of the yoke, and pins extending from the compensating means directly to the outer portion of the main housing at points midway between the ends of the yoke.

12. A power transmission for vehicles including an axle, a spindle, a hub, bearings interposed between the spindle and hub, an adjusting ring adjustably connected with the spindle, and having a plurality of holes therein, a locking plate secured to the spindle, and means connected with the locking plate in position to enter the holes in the adjusting ring for holding the latter in its adjusted position.

13. A power transmission for vehicles including an axle, a spindle, a main housing having a hub, bearings interposed between the spindle and hub, the spindle having a threaded portion, an adjusting ring screwed on said threaded portion and having a plurality of holes therein, a locking plate secured to the spindle, and means connected with said locking plate in position to enter the holes in the adjusting ring for holding the latter in its adjusted position.

14. A power transmission for vehicles including an axle, a spindle, a main housing having a hub connected with the spindle and having a space between said hub and the outer portion of the main housing, and means connected with the axle and extending into the space between the hub and the main housing and connected with said main housing for transmitting the motion of the axle to the main housing and permitting the main housing to be turned to steer the vehicle.

15. A power transmission for vehicles including an axle, a main housing, a hub, a power yoke secured to the axle, compensating rings connected with said power yoke, and pins extending from the hub to the outer portion of the main housing and pivotally supporting the power yoke.

In testimony whereof I affix my signature.

HARLEIGH R. HOLMES.